US007519343B2

(12) United States Patent
Kraegeloh et al.

(10) Patent No.: US 7,519,343 B2
(45) Date of Patent: Apr. 14, 2009

(54) RECEIVER FOR RECEIVING A DATA STREAM HAVING FIRST AND SECOND REFERENCE ENTRIES AND METHOD FOR OPERATING THE SAME

(75) Inventors: Stefan Kraegeloh, Erlangen (DE); Christian Scherl, Weiher (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 268 days.

(21) Appl. No.: 10/546,965

(22) PCT Filed: Nov. 10, 2003

(86) PCT No.: PCT/EP03/12522

§ 371 (c)(1),
(2), (4) Date: Sep. 26, 2006

(87) PCT Pub. No.: WO2004/073220

PCT Pub. Date: Aug. 26, 2004

(65) Prior Publication Data

US 2007/0054643 A1 Mar. 8, 2007

(30) Foreign Application Priority Data

Nov. 21, 2002 (DE) ................................. 102 54 405

(51) Int. Cl.
*H04B 1/16* (2006.01)
*H04L 7/00* (2006.01)

(52) U.S. Cl. ..................... 455/258; 455/226.1; 455/502; 375/354

(58) Field of Classification Search ................. 375/107, 375/340, 345, 354, 356, 371, 376; 455/501, 455/502, 503, 507, 63.1, 226.1, 230, 255, 455/256

See application file for complete search history.

(56) References Cited

U.S. PATENT DOCUMENTS

| 5,128,971 | A  | * | 7/1992  | Johnson ..................... 375/356 |
| 6,671,343 | B1 |   | 12/2003 | Ito ............................. 375/376 |
| 7,024,215 | B2 | * | 4/2006  | Krasner ..................... 455/502 |
| 7,154,976 | B2 | * | 12/2006 | Williams ..................... 375/371 |
| 7,254,190 | B2 | * | 8/2007  | Kwentus et al. ............. 375/340 |
| 7,315,216 | B2 | * | 1/2008  | Yang et al. .................... 331/25 |
| 2002/0056133 | A1 | * | 5/2002 | Fung et al. .................... 725/118 |
| 2003/0152177 | A1 | * | 8/2003 | Cahill-O'Brien et al. .... 375/354 |

FOREIGN PATENT DOCUMENTS

| EP | 0 705 000 A2 | 4/1996 |
| EP | 1 198 085 A1 | 4/2002 |
| JP | 2000209240 | 7/2000 |
| WO | WO 98/48570 | 10/1998 |

OTHER PUBLICATIONS

Berkhout, et al. Acoustic Control by Wave Field Synthesis. J. Acoust. Soc. Am 93 (5), May 1993, pp. 2764-2778.
Dunn, Sample Clock Jitter and Real-Time Audio over the IEEE 1394 High Performance Serial Bus. Presented at 106th Convention May 8-11, 1999 Munich, Germany, pp. 1-30.
International Search Report.

\* cited by examiner

*Primary Examiner*—Blane J Jackson
(74) *Attorney, Agent, or Firm*—Thomas, Kayden, Horstemeyer & Risley

(57) ABSTRACT

A receiver includes a receiver clock oscillator controllable with regard to its receiver oscillator frequency, means for detecting a number of clock periods that the receiver clock oscillator performs in a specifiable period of time, means for extracting a first and a temporally following second reference entry in a received data stream, wherein means for extracting is implemented in order to control means for detecting on the basis of the extracted first and second reference entry with regard to the specifiable period of time, and means for comparing the number of clock periods of the receiver clock oscillator with the information in the second reference entry in order to control the controllable oscillator depending on a comparison result so that the oscillator frequency is increased or decreased so that the oscillator frequency is in a predetermined ratio to a frequency of the clock oscillator in the transmitter or is equal to the frequency of the clock oscillator in the transmitter. This way, in a simple and secure way, without slow phase-locked loops for a jitter suppression, it is guaranteed that the receiver is fixedly synchronized with the transmitter and that simultaneously in case of a receiver array all receivers are also synchronized among each other.

15 Claims, No Drawings

RECEIVER FOR RECEIVING A DATA STREAM HAVING FIRST AND SECOND REFERENCE ENTRIES AND METHOD FOR OPERATING THE SAME

CROSS-REFERENCE TO RELATED APPLICATIONS

This is a United States national phase application of copending International Application No. PCT/EP03/12522, filed Nov. 10, 2003, which designated the United States and was not published in English.

BACKGROUND OF THE INVENTION

1. Field of the Invention

The present invention relates to receivers and in particular to synchronizing many receivers to a master clock.

2. Description of the Related Art

There is an increasing demand for new technologies and innovative projects in the field of entertainment electronics. It is an important precondition for the success of new multimedia systems to offer optimum functionalities or capabilities, respectively. This is achieved by the use of digital technologies and in particular computer technology. Examples for this are the applications offering an improved audio-visual impression close to reality. In present audio systems a main drawback is the quality of spatial acoustic reproduction of natural but also virtual environments.

Methods for a multi-channel loudspeaker reproduction of audio signals have been known and standardized for many years. All conventional technologies have the disadvantage that both the set-up location of the loudspeaker and the position of the listener are already embossed onto the transmission format. In a wrong arrangement of the loudspeakers with regard to the listener, audio quality clearly suffers. An optimum sound is only possible in a small range of the reproduction domain or space, the so-called sweet spot.

small range of the reproduction domain or space, the so-called sweet spot.

A better natural domain impression and a stronger enveloping in audio reproduction may be achieved with the help of a new technology. The bases of this technology, the so-called wave-field synthesis (WFS) were researched at the TU Delft and presented first in the late 80ies (Berkhout, A. J.; de Vries, D.; Vogel, P.: Acoustic control by Wave-field Synthesis. JASA 93, 1993).

As a consequence of the enormous requirements of this method with regard to computer performance and transmission rates, the wave-field synthesis was hitherto only rarely used in practice. Only the advances in the fields of microprocessor technology and audio encoding allow today the use of this technology in concrete applications. First products in the professional field are expected next year. In a few years, also first wave-field synthesis applications for the consumer area are to enter the market.

The basic idea of WFS is based on the application of the Huygens' principles of wave theory:

Every point on a propagating wavefront serves as the source of a wavelet propagating in a spherical or circular form, respectively.

If applied to acoustics, by a large number of loudspeakers arranged next to each other (a so-called loudspeaker array) any form of an incoming wavefront may be reproduced. In the simplest case, an individual punctual source to be reproduced and a linear arrangement of the loudspeakers, the audio signals of every loudspeaker have to be supplied with a time delay and an amplitude scaling so that the reflected sound fields of the individual loudspeakers are correctly overlaid. With several acoustic sources, for each source the contribution for each loudspeaker is calculated separately and the resulting signals are added. If the sources to be reproduced are in a room with reflecting walls, then also reflections have to be reproduced as additional sources via the loudspeaker array. The effort in calculating thus strongly depends on the number of acoustic sources, on the reflection characteristics of the recording room, and on the number of loudspeakers.

The advantage of this technology is in particular that a natural spatial sound impression is possible via a large area of the reproduction domain. In contrast to known technologies, direction and distance of acoustic sources are reproduced very accurately. In a limited way, virtual acoustic sources may even be positioned between the real loudspeaker array and the listener.

In the practical implementation problems result insofar that after the audio signals have been calculated for the individual loudspeakers, the same are distributed to the individual loudspeakers and then synchronously reproduced by the individual loudspeakers. As it was explained above, the individual loudspeakers have to be fed so that the signals output by the same correctly overlay in order to reconstruct an original "large" wave by overlaying many "small" waves so that a listener thinks that the "large" wave comes from an acoustic source arranged in another position and not from many individual loudspeakers, which respectively output a "small" wave. For this purpose it is of a decisive importance that the individual loudspeakers operate synchronously so that the individual wave calculated by the wave-field synthesis means are reproduced correctly, i.e. correctly converted into acoustic waves.

Typical systems operate digitally so that one sequence of digital samples is respectively supplied to the individual loudspeakers. A mutual synchronity of the individual loudspeakers is achieved when all loudspeakers are operated using the same sampling clock or "resampling" clock.

At this point it is to be noted that the problematic of synchronization also exists in many other places of audio technology. In live transmissions there is further the requirement that a sampling clock in the transmitter recording the audio scene to be transmitted is synchronous to the sampling clock in the receiver reproducing the transmitted audio scene. If the recording sampling clock and the reproduction sampling clock do not operate synchronously, samples would accumulate somewhere on the transmission path if the reproduction clock is too slow, or would run out if the reproduction clock is too fast. In order to mitigate this situation, buffers are built in, so that a certain deviation corresponding to the buffer size is allowed between the recording clock and the reproduction clock. Such buffers are usually built into the receiver, wherein the reproduction in the receiver takes place somewhat offset in time such that a reproduction only starts with a receiver buffer filled up to a certain degree. In such a case the recording clock and the reproduction clock may vary in certain limits determined by buffer size.

If such a concept would be transferred to the synchronization of many receivers in a wave-field synthesis, this would lead to a loss of audio quality, as no samples run out or no samples accumulate during transmission. There is, however, no control as to whether all receivers operate synchronously, i.e. that all receivers output their samples to their corresponding loudspeaker exactly at the point of time predetermined by the wave-field synthesis means.

In recent times, the so-called firewire data transmission format was proposed for a real-time transmission of audio signals. For this, reference is made to the expert's publication "Sample clock jitter and real-time audio over the IEEE 1394 high performance serial bus", Julian Dunn, 106. AES-Convention, May 8 to 11, 1999, Munich, Preprint 4920. In this expert's publication it is noted that in the IEEE 1394 data stream a sample jitter of 40 ns is to be expected and that further a jitter frequency occurs depending on the frequency deviation between usually the crystal oscillator in the transmitter and the crystal oscillator in the receiver. Usually, each firewire node, i.e. each transmitter or receiver, respectively, includes a free-running crystal oscillator having 24.576 MHz. This clock is used in order to increment a cycle-time register in each node. The node defined as cycle master transmits a cycle start packet in intervals of 125 µs, i.e. with a frequency of 8 kHz. This start packet defines the start of an isochronous cycle according to IEEE 1394. This packet has a value enabling other nodes on the bus to align their cycle-time registers in order to correct a drifting due to somewhat different clock frequencies. After a cycle start packet is transmitted on the bus, it is subjected to a reclocking jitter, so that in the cycle-time register alignment also a jitter results.

Based on these jitter problems and the temporarily varying jitter frequency, during the audio reproduction in multi-channel audio systems and in particular in wave-field synthesis applications audible artefacts occur. If, alternatively, a slow PLL is used in order to attenuate the jitter in the audio reproduction clock, the firm delay between input and output is lost, which may lead to a sample de-synchronization of the individual receivers and in the worst case even to a loss of samples. In multi-channel applications, therefore a fixed timing, i.e. a fixed synchronization between individual channels, is a substantial requirement.

SUMMARY OF THE INVENTION

It is an object of the present invention to provide a receiver, a receiver array, or a method for operating a receiver, respectively, suitable for a fixed synchronization and quickly and easily operating in the implementation.

In accordance with a first aspect, the present invention provides a receiver for receiving a data stream generated by a transmitter, wherein the data stream comprises a first reference entry and a temporarily following second reference entry, wherein the second reference entry comprises information about a number of clock periods performed by a clock oscillator in the transmitter since the first reference entry, having a receiver clock oscillator controllable with regard to its receiver oscillator frequency; a detector for detecting a number of clock periods that the receiver clock oscillator performs in a specifiable period of time; an extractor for extracting the first and the second reference entry, wherein the extractor for extracting is implemented in order to control the detector for detecting on the basis of the extracted first and second reference entries with regard to the specifiable period of time; and a comparator for comparing the number of clock periods of the receiver clock oscillator to the information in the second reference entry, wherein the comparator for comparing is further implemented in order to control the receiver clock oscillator depending on a comparison result in order to increase or decrease the oscillator frequency such that the oscillator frequency is in a predetermined ratio to a frequency of the clock oscillator in the transmitter or is equal to the frequency of the clock oscillator in the transmitter.

In accordance with a second aspect, the present invention provides a receiver array having a plurality of receivers, wherein each receiver is implemented according to a receiver for receiving a data stream generated by a transmitter, wherein the data stream comprises a first reference entry and a temporally following second reference entry, wherein the second reference entry comprises information about a number of clock periods performed by a clock oscillator in the transmitter since the first reference entry, having a receiver clock oscillator controllable with regard to its receiver oscillator frequency; a detector for detecting a number of clock periods that the receiver clock oscillator performs in a specifiable period of time; an extractor for extracting the first and the second reference entry, wherein the extractor for extracting is implemented in order to control the detector for detecting on the basis of the extracted first and second reference entries with regard to the specifiable period of time; and a comparator for comparing the number of clock periods of the receiver clock oscillator to the information in the second reference entry, wherein the comparator for comparing is further implemented in order to control the receiver clock oscillator depending on a comparison result in order to increase or decrease the oscillator frequency such that the oscillator frequency is in a predetermined ratio to a frequency of the clock oscillator in the transmitter or is equal to the frequency of the clock oscillator in the transmitter, wherein the transmitter is implemented as a master, and wherein each receiver is implemented in order to obtain the first and the second reference entry from the transmitter so that all receivers are synchronized to the same transmitter.

In accordance with a third aspect, the present invention provides a method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, having the steps of detecting a number of clock periods that the receiver clock oscillator performs in a specifiable period of time; extracting the first and the second reference entry; controlling the steps of detecting on the basis of the extracted first and second reference entry with regard to the specifiable period of time; comparing the number of clock periods of the receiver clock oscillator to the information in the second reference entry; and controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter.

In accordance with a fourth aspect, the present invention provides A computer program having a program code for performing the method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, having the steps of detecting a number of clock periods that the receiver clock oscillator performs in a specifiable period of time; extracting the first and the second reference entry; controlling the steps of detecting on the basis of the extracted first and second reference entry with regard to the specifiable period of time; comparing the number of clock periods of the receiver clock oscillator to the information in the second reference entry; and controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter, when the program runs on a computer.

The present invention is based on the finding that for a fixed synchronization between a transmitter and a receiver and thus also between several receivers among each other phase-locked loops with narrow-banded loop filters, i.e. slow phase-locked loops, are unsuitable. According to the invention, a synchronization on the basis of reference entries contained in a data stream is performed, wherein a reference entry comprises information about a number of clock periods, which a clock oscillator in the transmitter has performed since a preceding reference entry. In the receiver itself means for detecting a number of clock periods is provided, performed by a receiver clock oscillator provided in the receiver in a specified period of time. Further, from the data stream a reference entry is extracted, whereupon then the oscillations performed by the receiver clock oscillator in the specified period of time are compared to the value contained in the reference entry of the data stream concerning the number of oscillations that the transmitter performed in the corresponding period of time in order to readjust the receive clock oscillator on the basis of this comparison. According to the invention, no direct feedback is performed with a very narrow-banded loop filter in order to get the jitter problematic under control. Instead, on the basis of the information contained in the data stream and on the basis of information equally derived in the receiver with regard to the frequencies of the transmitter oscillator and the receive clock oscillator a readjustment of the receive clock oscillator is performed.

The present invention is advantageous in particular insofar that it guarantees a transparent oscillator tracking in the receiver which is not only fixed in the temporal average, like a slow phase-locked loop. Instead, for every new reference entry in the data stream a transparent receiver tracking is provided. This transparency is decisive for the fact that for a receiver array all receivers are held in a fixed relation to each other without the receivers having to be synchronized among each other. This is achieved by the fact that all receivers readjust their individual oscillators using the same reference entry in the data stream coming from a master node. Thus, simultaneously a fixed relation between the transmitter and the receiver is maintained so that no difficulties with regard to audible artefacts and sample slips occur.

In addition to this, the inventive receiver is simple and may therefore be implemented at low costs, as only logic circuits as a counter and comparator, and in the preferred embodiment of the present invention only a digital/analog converter, are required in order to generate the analog control signal for the controllable oscillator.

Such logic circuits operate quickly and may be implemented at low costs. The aspect of price is of a special importance in this connection, as quite possibly numbers of 100 to 200 receivers have to be considered if an audio projection room is operated with a loudspeaker array supplied by a wave-field synthesis unit having audio reproduction signals.

It is a further advantage of the present invention that, because of the simplicity of the implementation and the fact that no slow elements like a slow phase-lock loop, etc., are used, a tracking of the oscillator is very quick. In a preferred embodiment of the present invention it is further preferred to achieve a quantitative tracking insofar that the oscillation frequency of the receive clock oscillator is not increased or decreased with predetermined increments, although this would basically also be possible, but that a quantitative calculation of the oscillation frequency change is performed on the basis of the present number of clocks performed by a transmitter oscillator in the specified period of time, and on the basis of the number of clocks performed by the receive clock oscillator in the specified period of time, in order to directly calculate the absolute tracking amount quantitatively. Thus, it is guaranteed that the receive clock oscillator of a receiver always tracks the transmitter oscillator exactly offset in time by the reference period of time and if applicable a small processing time. Any other receivers in an inventive receiver array also exactly follow a transmitter oscillator in this time pattern, so that among the individual receivers in the receiver array synchronization is achieved without the individual receivers having to be connected to each other.

DESCRIPTION OF THE PREFERRED EMBODIMENTS

An embodiment includes a receiver for receiving a data stream fed into an input. The data stream comes from a transmitter and includes a first reference entry and a temporarily following second reference entry. The second reference entry includes information about a number of clock periods, which a clock oscillator has performed in the transmitter since the first reference entry.

The receiver further includes means for receiving and recovering at least the first and the second reference entry, wherein information about the first and the second reference entry are output at an output. Payload data in the data stream also received and recovered by means are output at an output of means. The receiver further includes a clock period detection preferably implemented as a counter and having a start/stop input connected to the reference entry line. Further, a controllable oscillator is provided which supplies from means for comparing the period number value standing in the second reference entry to an output value of the clock period detection reproducing the number of periods of the controllable oscillator between the first and the second reference entry.

The controllable oscillator includes a clock output coupled to the clock period detection means so that the same may count the clock periods of the output clock of the controllable oscillator. The output clock of the controllable oscillator may either be used directly as a data clock in order to be fed to means for receiving and recovering. Typically, however, the data clock using which payload data is output (at output), will be substantially lower than the operating clock of the controllable oscillator. For this purpose, an optional divider is provided in order to derive a reproduction clock at an output from the clock of the controllable oscillator. The clock divider may divide by any rational number X. For integer divider ratios, i.e. when X is an integer number, the divider may be implemented particularly simple as a direct frequency divider. For non-integer divider ratios, a phase-locked loop may be used. Based on the fact that by the inventive concept already a jitter attenuation was performed, the phase-locked loop for dividing in means is implemented as a very fast phase-locked loop without special jitter attenuation. In other words, if it comprises a loop filter at all, it will comprise a loop filter having a substantially higher cut-off frequency than the jitter frequency of the controllable oscillator.

The controllable oscillator is preferably implemented as a voltage-controlled crystal oscillator (VCXO) operating very precisely and thus having to be readjusted only by very small amounts. The inventive concept of controlling the oscillator is also applicable, however, also to less precisely operating oscillators. Thus, for example, digital oscillators with an odd number of feedback inverters may be used, wherein the clock frequency of such an oscillator is determined by an operating current and not by an operating voltage.

Every controllable oscillator has a characteristic curve by which an output frequency is uniquely associated with a control signal. The control signal will typically be an analog control signal generated by means for comparing and controlling by the fact that the same typically comprises a digital/analog converter on the output side, which provides a current or a voltage on the output side, which uniquely corresponds to a digital value provided on the input side.

In a preferred embodiment of the present invention, the data stream is defined according to the IEEE 1394 format, so that it contains reference entries in a 8 kHz clock, i.e. with an interval of 125 μs. Each reference entry is generated such that a counter is provided in the transmitter operating as follows. Its maximum count value, after switching to zero, is 3072, which corresponds to a nominal value of 125 μs. If everything is ideal, the counter always starts with zero and for example transfers the time mark of zero into the data stream. If, however, jitter occurs, then the counter will sometimes embed time marks deviating from zero into the data stream, like e.g. 3070 or 2. The output value at the time of the next time mark event is written into a next reference entry. The counter in the transmitter oscillator keeps on counting unimpressed and counts, up to the generation of the next reference entry, again the number of the transmitter clock oscillator periods. It is to be noted, that in the ideal case the counter always starts at zero, i.e. is basically automatically reset based on its maximum count value with every reference entry. This is not absolutely necessary for any counter, as long as the counters in the transmitter and in the receiver are matched to each other such that the receiver may interpret the count value of the transmitter for synchronization purposes.

In a preferred embodiment of the present invention, the receiver is implemented accordingly such that it includes the oscillator and the clock period detection means, preferably also implemented as a counter. At the point of time when means detects a reference entry, the clock period detection means is started. At the point of time when means for receiving and recovering detects a next reference entry, the clock period detection means is stopped. The counter value indicated then is fed to means simultaneously including the number of oscillator periods of the transmitter oscillator in the second reference entry. A comparison directly indicates whether the controllable oscillator in the receiver is faster (the clock period detection means detected a larger count value than in the second reference entry) or whether the controllable oscillator 16 is slower than the corresponding oscillator in the transmitter (the clock period detection means determined a smaller value than in the second reference entry).

Depending on the implementation, means for comparing is implemented in order to readjust the controllable oscillator by a fixed increment which is of a constant size or decreases down a certain small value from readjusting action to readjusting action.

Preferably, means for comparing and controlling is implemented, however, in order to perform a quantitatively correct readjustment. In this case, means for comparing may for example calculate a proportional ratio between the number of periods in the reference entry and the number of periods detected by the clock detection means and post-control the controllable oscillator on the basis of this proportional ratio such that the frequency that the transmitter oscillator had between the first reference entry and the second reference entry is directly reproduced by the controllable oscillator in the receiver. For this, means for comparing and controlling is further implemented in order to have information about the characteristic curve of the controllable oscillator in order to calculate a correct control signal change which leads to a desired proportional change of the receiver oscillator clock frequency determined by the comparison means.

It is to be noted that for the present invention the nominal frequencies of the transmitter clock oscillator and the receive clock oscillator do not necessarily have to be the same. If the transmitter clock oscillator for example operates with double the frequency of the receiver clock oscillator, means for receiving and recovering would be implemented to halve the number of periods in a reference entry in order to then perform the comparison using the halved value and to post-control the oscillator on the basis of the comparison. Thus, any combinations of receiver oscillator nominal frequencies and transmitter oscillator nominal frequencies are possible.

Alternatively, in the reference entry a deterministic offset may be contained. Such an offset may also be contained in a period number determined by the clock period detection means. As long as such an offset is periodic it may easily be eliminated in the comparison or in calculating the control quantity by means.

A receiver, according to a preferred embodiment of the present invention, implements the controllable oscillator is implemented as a crystal VCO, wherein means for receiving and recovering is implemented as an IEEE 1394 receiver, wherein the clock period detection means, is implemented as a counter and means for comparing and controlling, includes a comparator and a down-stream digital/analog converter in order to supply an analog voltage value for frequency control to the crystal VCO.

The local counter thus counts the pulses from the local crystal VCO as a local clock generator. The counter value of the local counter is periodically compared to the received counter value. The mismatches between the local counter value and the received counter are used to set the local clock oscillator.

It is to be noted that the counter and comparator logic, i.e. the functionalities of various means elements may be implemented in hardware in the form of a PLD (PLD=programmable logic device), in the form of a FPGA (FPGA=field programmable gate array) or in software for example on a DSP (DSP=digital signal processor) or in a general purpose processor, like e.g. within a PC.

In the following, an embodiment having a transmitter/multi-receiver scenario for a multi-channel audio system is presented. The transmitter receives audio data and auxiliary information on the input side for the wave-field synthesis. The transmitter includes a wave-field synthesis module, the transmitter oscillator, the reference input generation means, and a data stream multiplexer in order to provide a data stream with payload data for individual loudspeakers, this data stream further comprising reference entries. The interval of the reference entries in the data stream is preferably periodic and is achieved by the fact that the oscillator controls the data stream multiplexer always when a reference entry is to be written from the reference generation means into the data stream. The reference generation means is implemented in order to always count the number of clock periods of the transmitter oscillator from one reference time to the next reference time, as it was discussed above in connection with the first embodiment.

This scenario further includes a plurality of receivers E1, E2, E3, . . . , En, which are all implemented such as it was discussed in the example of an individual receiver. All receivers either receive the complete data stream in which data for all receivers is contained. Alternatively, the system may also be implemented such that each receiver receives the payload data portion determined for the same.

In any case, each individual receiver receives the same sequence of reference entries from the transmitter, so that the transmitter operates as a master node without intervening hierarchy steps.

It will be understood that the master node addresses nodes of the first level, which in turn address nodes on the second level. The reference entries in the data stream are, however, also used, for example, by the first node 40 in order to synchronize. In the data stream running from a first node to a second node, again the same reference entry originally generated by the master node is "passed on", so that all nodes, whether they are connected in parallel or connected in series, are synchronized from the same master clock.

According to the invention, thus the jitter attenuation PLL is avoided in systems according to the prior art by the fact that the system crystals of the individual nodes are brought in unison. For this, in all nodes except for the master node, instead of the normal crystal oscillator a pullable crystal oscillator is used, wherein this is continuously tracked so that a deviation as small as possible is present between the individual nodes. The tracking occurs, as it was discussed, by the fact that each node counts the oscillations of a crystal and compares same to the ones of the master node.

Depending on the circumstances, the inventive method for operating a receiver may be implemented in hardware or in software. The implementation may take place on a digital storage medium, in particular a floppy disk or a CD with electronically readable control signals, which may cooperate with a programmable computer system so that the method is performed. In general, the invention thus also consists in a computer program product with a program code stored on a machine-readable carrier for performing the inventive method when the computer program product runs on a computer. In other words, the invention may thus be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A receiver for receiving a data stream generated by a transmitter, wherein the data stream comprises a first reference entry and a temporally following second reference entry, wherein the second reference entry comprises information about a number of clock periods performed by a clock oscillator in the transmitter since the first reference entry, comprising:
   a receiver clock oscillator controllable with regard to its receiver oscillator frequency;
   a detector for detecting a number of clock periods that the receiver clock oscillator performs in a specifiable period of time;
   an extractor for extracting the first and the second reference entry, wherein the extractor for extracting is implemented in order to control the detector for detecting on the basis of the extracted first and second reference entries with regard to the specifiable period of time; and
   a comparator for comparing the number of clock periods of the receiver clock oscillator to the information in the second reference entry,
   wherein the comparator for comparing is further implemented in order to control the receiver clock oscillator depending on a comparison result in order to increase or decrease the oscillator frequency such that the oscillator frequency is in a predetermined ratio to a frequency of the clock oscillator in the transmitter or is equal to the frequency of the clock oscillator in the transmitter,
   wherein the data stream further includes a sequence of samples or information as a payload from which the sequence of samples is derivable, wherein the sequence of samples is outputtable by a reproduction frequency that is derivable from a frequency of the receiver clock oscillator,
   wherein the reproduction frequency and the receiver oscillator frequency are in an integer ratio and the reproduction frequency is smaller than the receiver oscillator frequency,
   wherein the receiver further comprises:
      a direct frequency divider for providing the reproduction clock from the receiver oscillator clock, and
      wherein the data stream is specified according to a format IEEE 1394, wherein the receiver oscillator frequency is 24.576 MHz, wherein the reproduction frequency is 48 kHz, and wherein the direct frequency divider is implemented in order to implement a division ratio of 512.

2. The receiver according to claim 1, wherein the detector for detecting comprises a counter that is startable at the beginning of a specifiable period of time and that is stoppable at the end of a specifiable period of time.

3. The receiver according to claim 2, wherein the extractor for extracting is implemented in order to start the counter in response to extracting the first reference entry and to stop the same in response to extracting the second reference entry.

4. The receiver according to claim 1, wherein the information about the number of clock periods in the second reference entry directly includes the number of clock periods,
   wherein the comparator for comparing is implemented, in a case in which the number of the clock periods of the receiver oscillator is smaller than the number of clock periods of the transmitter oscillator, to control the receiver clock oscillator in order to increase its frequency, or in the case in which the number of the clock periods of the receiver oscillator is higher than the number of clock periods of the transmitter oscillator, to control the receiver oscillator in order to decrease its frequency.

5. The receiver according to claim 1,
   wherein the comparator for comparing is implemented in order to control the receiver clock oscillator in order to increase or decrease the oscillator frequency by a predetermined amount.

6. The receiver according to claim 5, wherein the predetermined amount is gradually decreased.

7. The receiver according to claim 1, wherein the comparator for comparing is implemented in order to quantitatively calculate an amount, by which the oscillator frequency is increased or decreased, on the basis of a comparison result.

8. The receiver according to claim 1,
   wherein the comparator for comparing is implemented to convert an amount, by which the oscillator frequency of the receiver clock oscillator is to be changed, by use of a characteristic curve of the receiver clock oscillator by which a control signal of the receiver oscillator is related to a frequency of the receiver clock oscillator, and the comparison result, into a change of the control signal, so that a current frequency of the receiver clock oscillator corresponds to a frequency of the reference oscillator between the first and the second reference point of time.

9. The receiver according to claim 1, wherein the comparator for comparing is implemented in order to leave a deterministic offset contained in a second reference entry and/or a deterministic offset contained in the number of receiver clock periods out of consideration.

10. A receiver array having a plurality of receivers, wherein each receiver is implemented according to a receiver for receiving a data stream generated by a transmitter, wherein the data stream comprises a first reference entry and a temporally following second reference entry, wherein the second reference entry comprises information about a number of clock periods performed by a clock oscillator in the transmitter since the first reference entry, comprising:
- a receiver clock oscillator controllable with regard to its receiver oscillator frequency;
- a detector for detecting a number of clock periods that the receiver clock oscillator performs in a specifiable period of time;
- an extractor for extracting the first and the second reference entry, wherein the extractor for extracting is implemented in order to control the detector for detecting on the basis of the extracted first and second reference entries with regard to the specifiable period of time; and
- a comparator for comparing the number of clock periods of the receiver clock oscillator to the information in the second reference entry,
- wherein the comparator for comparing is further implemented in order to control the receiver clock oscillator depending on a comparison result in order to increase or decrease the oscillator frequency such that the oscillator frequency is in a predetermined ratio to a frequency of the clock oscillator in the transmitter or is equal to the frequency of the clock oscillator in the transmitter,
- wherein the transmitter is implemented as a master, and
- wherein each receiver is implemented in order to obtain the first and the second reference entry from the transmitter so that all receivers are synchronized to the same transmitter,
- wherein each receiver is implemented in order to control one or several loudspeakers, and
- wherein the transmitter comprises a wave-field synthesis module in order to calculate reproduction information for all loudspeakers that are controllable by the receiver array that are to be output with a specified reproduction frequency.

11. A method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, comprising:
- detecting a number of clock periods that the receiver clock oscillator performs in a specifiable period of time;
- extracting the first and the second reference entry;
- controlling the step of detecting on the basis of the extracted first and second reference entry with regard to the specifiable period of time;
- comparing the number of clock periods of the receiver clock oscillator to the information in the second reference entry; and
- controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter,
- wherein the data stream further includes a sequence of samples or information as a payload from which the sequence of samples is derivable, wherein the sequence of samples is outputtable by a reproduction frequency that is derivable from a frequency of the receiver clock oscillator,
- wherein the reproduction frequency and the receiver oscillator frequency are in an integer ratio and the reproduction frequency is smaller than the receiver oscillator frequency,
- the method further comprising:
  - providing the reproduction clock from the receiver oscillator clock using a direct frequency divider, and
  - wherein the data stream is specified according to a format IEEE 1394, wherein the receiver oscillator frequency is 24.576 MHz, wherein the reproduction frequency is 48 kHz, and wherein the direct frequency divider is implemented in order to implement a division ratio of 512.

12. A computer program having a program code stored on a storage medium for performing a method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, the method comprising:
- detecting a number of clock periods that the receiver clock oscillator performs in a specifiable period of time;
- extracting the first and the second reference entry;
- controlling the step of detecting on the basis of the extracted first and second reference entry with regard to the specifiable period of time;
- comparing the number of clock periods of the receiver clock oscillator to the information in the second reference entry; and
- controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter,
- wherein the data stream further includes a sequence of samples or information as a payload from which the sequence of samples is derivable, wherein the sequence of samples is outputtable by a reproduction frequency that is derivable from a frequency of the receiver clock oscillator,
- wherein the reproduction frequency and the receiver oscillator frequency are in an integer ratio and the reproduction frequency is smaller than the receiver oscillator frequency,
- the method further comprising:
  - providing the reproduction clock from the receiver oscillator clock using a direct frequency divider, and wherein the data stream is specified according to a format IEEE 1394, wherein the receiver oscillator frequency is 24.576 MHz, wherein the reproduction frequency is 48 kHz, and wherein the direct frequency divider is implemented in order to implement a division ratio of 512, when the program runs on a computer.

13. A receiver for receiving a data stream generated by a transmitter, wherein the data stream comprises a first reference entry and a temporally following second reference entry, wherein the second reference entry comprises information about a number of clock periods performed by a clock oscillator in the transmitter since the first reference entry, comprising:

a receiver clock oscillator controllable with regard to its receiver oscillator frequency;

a detector for detecting a number of clock periods that the receiver clock oscillator performs in a specifiable period of time;

an extractor for extracting the first and the second reference entry, wherein the extractor for extracting is implemented in order to control the detector for detecting on the basis of the extracted first and second reference entries with regard to the specifiable period of time; and a comparator for comparing the number of clock periods of the receiver clock oscillator to the information in the second reference entry, wherein the comparator for comparing is further implemented in order to control the receiver clock oscillator depending on a comparison result in order to increase or decrease the oscillator frequency such that the oscillator frequency is in a predetermined ratio to a frequency of the clock oscillator in the transmitter or is equal to the frequency of the clock oscillator in the transmitter, wherein the data stream further includes a sequence of samples or information as a payload from which the sequence of samples is derivable, wherein the sequence of samples is outputtable by a reproduction frequency that is derivable from a frequency of the receiver clock oscillator, wherein the reproduction frequency and the receiver oscillator frequency are in no integer ratio to each other, and wherein the receiver further includes a phase-locked loop having a loop filter, which is implemented broad-banded such that a clock jitter of the receiver clock oscillator is not suppressed.

14. A method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, comprising:

detecting a number of clock periods that the receiver clock oscillator performs in a specifiable period of time;

extracting the first and the second reference entry;

controlling the step of detecting on the basis of the extracted first and second reference entry with regard to the specifiable period of time;

comparing the number of clock periods of the receiver clock oscillator to the information in the second reference entry; and controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter, wherein the data stream further includes a sequence of samples or information as a payload from which the sequence of samples is derivable, wherein the sequence of samples is outputtable by a reproduction frequency that is derivable from a frequency of the receiver clock oscillator, wherein the reproduction frequency and the receiver oscillator frequency are in no integer ratio to each other, and the receiver further comprising a phase-locked loop having a loop filter, which is implemented broad-banded such that a clock jitter of the receiver clock oscillator is not suppressed.

15. A computer program having a program code stored on a storage medium for performing a method for operating a receiver, the receiver comprising a receiver clock oscillator controllable with regard to its receiver oscillator frequency and implemented for receiving a data stream which was generated by a transmitter, wherein the data stream comprises a first reference entry and a temporarily following second reference entry, wherein the second reference entry comprises information about a number of clock periods that a clock oscillator has performed in the transmitter since the first reference entry, the method comprising:

detecting a number of clock periods that the receiver clock oscillator performs in a specifiable period of time;

extracting the first and the second reference entry;

controlling the step of detecting on the basis of the extracted first and second reference entry with regard to the specifiable period of time;

comparing the number of clock periods of the receiver clock oscillator to the information in the second reference entry; and controlling the controllable oscillator depending on a comparison result in order to increase or decrease the oscillator frequency so that the oscillator frequency is in a predetermined ratio to a frequency of the clock oscillator in the transmitter or equal to the frequency of the clock oscillator in the transmitter, wherein the data stream further includes a sequence of samples or information as a payload from which the sequence of samples is derivable, wherein the sequence of samples is outputtable by a reproduction frequency that is derivable from a frequency of the receiver clock oscillator, wherein the reproduction frequency and the receiver oscillator frequency are in no integer ratio to each other, and the receiver further comprising a phase-locked loop having a loop filter, which is implemented broad-banded such that a clock jitter of the receiver clock oscillator is not suppressed, when the program runs on a computer.

* * * * *